Patented Aug. 7, 1923.

1,464,153

UNITED STATES PATENT OFFICE.

CARLETON ELLIS, OF MONTCLAIR, NEW JERSEY, ASSIGNOR, BY MESNE ASSIGNMENTS, TO SETH B. HUNT, TRUSTEE, OF MOUNT KISCO, NEW YORK.

PROCESS OF MAKING USEFUL PRODUCTS FROM BY-PRODUCT STILL GASES AND GASES FROM CRACKING OPERATIONS.

No Drawing.   Application filed April 14, 1919.   Serial No. 289,961.

*To all whom it may concern:*

Be it known that I, CARLETON ELLIS, a citizen of the United States, and a resident of Montclair, in the county of Essex and State of New Jersey, have invented certain new and useful Improvements in Processes of Making Useful Products from By-Product Still Gases and Gases from Cracking Operations, of which the following is a specification.

This invention relates to a method of utilizing still gases especially those obtained from the cracking of petroleum oil to produce gasoline and the like, and relates in particular to a method of utilizing the unsaturated constituents thereof and to means for increasing the proportion of the latter when desired.

By still gases I include the gases and vapors obtained in the cracking of oils especially petroleum oils in various forms of apparatus such as stills, retorts, pipes, tubes, flashing surfaces and embrace not only the still gases of the ordinary refinery obtained through distillation in various ways including cracking as aforesaid but also gases such as may be obtained by the Pintsch gas or Blau gas systems. The term gas as used herein will be understood to refer to gases themselves or mixtures of gases and vapors as obtained by the foregoing operations especially the gas and vapor products obtained from ordinary water condensation of distillates or as may be obtained after scrubbing with oils or from compression systems, etc., which are designed to remove the more readily liquified constituents.

The process is directed especially to the recovery and utilization of the lower olefines such as ethylene, propylene, butylene, amylene and the like. These are found in the gases derived from cracking operations and may be present in an amount of say 5 to 15% under ordinary conditions.

The first step in the operation preferably is to remove hydrogen sulphide which is often present when oils containing sulphur are cracked. This may be removed by treatment with caustic soda or with iron hydrate and similar extracting materials. Of course when the gases are sufficiently free from hydrogen sulphide such treatment may be eliminated. If the latter gas is present in any substantial amount it interferes seriously with further operations.

The next step in the operation preferably is the extraction of the higher olefines to produce useful products. This may be done by passing the gases and vapors through sulphuric acid which has been somewhat diluted preferably to a specific gravity of 1.8 and maintaining the temperature fairly low so that sulphating conditions ensue. In this manner an acid extract is obtained containing sulphated derivatives of propyl, butyl, and higher olefins. This extract is valuable for the production of alcohols by hydrolysis. Or for making esters by reacting with the alkali salts of fatty acids such for example, as sodium acetate. In carrying out the extraction of the higher olefines preferably the sulphuric acid is mixed with several volumes of an inert oil such as ordinary heavy petroleum oil, gas oil and the like which facilitates the absorption of these higher olefines and is an advantageous phase of operation. In this way the gas may be freed of a substantial or the major portion of the higher olefines and the next step in the operation, in the preferred manner of procedure, is the extraction of ethylene. If the object is to produce a pure ethylene extract the gases should be further purified as they are likely to contain traces of moderate quantities of the higher olefines.

The extraction of the ethylene is carried out by means of stronger sulphuric acid which may be highly concentrated or fuming acid and which may be heated somewhat in order to facilitate the absorption. While olefines higher than ethylene are very sensitive to strong acid forming polymers and tars which are also facilitated by heating, ethylene is not thus sensitive and may be absorbed by strong and hot acid without much of any carbonization. To prepare an ethylene extract which is substantially free from propylene and higher olefine products and the resultant of their polymerization and decomposition, the gases may be passed into sulphuric acid of say 1.8 strength which is heated to 50° or higher so as to carbonize the higher olefines without absorbing the ethylene to any material extent. The ethylene is then passed into acid of say 100% strength and even fuming acid and absorption takes place therein with the formation of relatively pure ethyl sulphuric acid. The absorption of the ethylene is facilitated by presence of an oil preferably one which is relatively unaffected by sulphuric acid and preferably I employ good quality paraffin wax carrying out the absorption of the ethylene at a temperature above the melting point of the wax, say for example, at 60 to 70° C. Of course it is possible to use lower grades of wax such as scale wax and the like, also various pitches, liquid tars of a resistant character, sulphonic acids such as the sulphonic acids obtained in sulphonating petroleum oils or as may be obtained in refining operations, also bodies such as benzene sulphonic acid, napthalene sulphonic acid, etc. The sulphuric acid may be mixed with one of these absorbing agents preferably as indicated one which is immiscible with the sulphuric acid and the purified ethylene gas passed therethrough at the desired absorbing temperature, which may vary according to conditions. Preferably three to ten volumes of immiscible oil or wax is employed to one volume of sulphuric acid.

In this absorbing reaction as well as in the absorption of the higher olefines to make useful products the absorption may take place in horizontal cylinders or drums of the requisite capacity which are say two-thirds filled with the mixture of sulphuric acid and oil or wax and which have coils or jackets so that the mixture may be cooled as required for the absorption of the propylene and other higher olefines under suitable sulphating conditions while in the case of ethylene the mixture may be heated by means of steam to raise the temperature to a suitable sulphating condition.

Thus extracts derived from olefines of more than two carbon atoms may be obtained having a specific gravity of say 1.3 to 1.4 and similarly extracts derived from ethylene of approximately the same specific gravity may be obtained. These may be combined if desired and hydrolyzed by dilution with water and steam distillation to yield a mixture of alcohols containing ordinary ethyl alcohol together with higher alcohols which are largely of a secondary character and including isopropyl alcohol, isobutyl alcohol, isoamyl alcohol, etc., the exact composition depending of course, upon the nature of the gases initially employed. Or this mixture of the two extracts may be esterified by reacting with an alkali salt of an organic acid such as sodium or calcium acetate, formate, butyrate, benzoate, etc. If desired the acid extract may be enriched by the addition of an alcohol such as ethyl, propyl, butyl, amyl alcohol and the like, either primary or secondary alcohols being employed. An aromatic alcohol such as benzyl alcohol may be used.

Or the mixture of alcohols obtained may be catalytically oxidized or chemically oxidized to produce ketones and fatty acids for example the mixture of alcohols may be passed over a heated copper spiral or copper gauze preferably with the addition of a moderate amount of air to yield acetone and higher ketones while the ethyl alcohol when present will yield aldehyde or acetic acid according to conditions.

Instead of mixing the acid extracts as indicated in some cases it is preferable to obtain the higher alcohols or their esters or other derivatives separate from the ethylene derivatives and in that case the extracts are not mixed but are treated separately by hydrolysis, esterification, chlorination, nitration, oxidation or other suitable reaction and in a similar manner the ethylene extract is duly treated in the specific manner desired. Thus the extract derived from ethylene, especially when purified by the intermediate carbonizing steps described above, on hydrolysis will yield ethyl alcohol or by acetylation, ethyl acetate. Thus in a like manner other esters may be obtained by reaction with the acid extract through the agency of alkali salts of organic acids or by the acids themselves. In a similar manner ethers may be obtained ordinarily ethyl ether in a desirable state of purity being produced while from the extract of the higher olefines the propyl and other ethers may be secured. One feature of the invention is the utilization of the mixed acid extracts to yield a mixture of ethyl, propyl and other ethers which may be used as a solvent. As ethylene and propylene usually predominate in still gases the mixture of the ethers will contain a predominating amount of the ethyl and propyl bodies. In addition to the use of this material as a solvent it may be employed as an anaesthetic in some cases as for example by veterinarians.

Thus from the still gases which are commonly regarded as waste products, useful only for fuel purposes, the higher olefines and ethylene may be extracted and converted into products of great value in the arts. The residual gases which are substantially or entirely freed from unsaturated compounds may be further utilized by passing through heated tubes or over a hot refractory material to produce additional amounts of ethylene and to some extent higher unsaturated bodies. Or these gases may be dehydrogenated by passing over a nickel, cobalt or copper catalyzer heated to a red heat or higher to produce unsaturated products which may be utilized in the above manner. As further heating and cracking or dehydrogenating of the extracted still gases tends largely to the formation of ethylene in most cases this step may be used to produce a gas especially rich in ethylene which may be converted into ethyl sulphuric acid and into diethyl sulphate. The latter is what may be termed a neutral ester and may be employed to advantage in ethylating reactions of various sorts, such as in the ethylation of glycerine and also starch, sugars, cellulose and the like. For example in the ethylation of cellulose, ordinary cellulose may be converted into alkali cellulose and in the alkaline state reacted on with the diethyl sulphate obtained from the still gas thereby forming ethyl cellulose ethers which may be employed in the arts as a substitute for celluloid, nitrocellulose, cellulose acetate and the like. In a similar manner the dipropyl sulphate or the ethyl propyl sulphate, or in other words the higher neutral sulphuric esters or the mixed neutral sulphuric esters may be employed with cellulose, starch and the like to produce mixed ethyl and propyl, etc., starch and cellulose ethers, and the present invention contemplates the treatment of still gases to ultimately form reaction products of this character yielding such cellulose or starch ethers in addition to the propyl and other ethers referred to above.

What I claim is:

1. The process of utilizing hydrocarbon gases containing olefines for the preparation of useful products from substantially the entire olefine content thereof in which such gases are treated, while cooling, with sulfuric acid, the effective strength of which is progressively reduced during reaction to such extent that sulfuric acid of about 1.8 specific gravity is reduced in strength until reactive acid liquor of specific gravity of not over 1.4 is obtained, and treating the residual gases with sulfuric acid of higher strength than that of aqueous sulfuric acid of 1.8 specific gravity at a temperature above 60° C., continuing the reaction until ethyl sulfuric acid of specific gravity of not over 1.4 is obtained.

2. The process of utilizing hydrocarbon gases containing olefines for the preparation of useful products from substantially the entire olefine content thereof, in which such gases are treated, while cooling, with sulfuric acid, the effective strength of which is progressively reduced during such reaction to such extent that sulfuric acid of about 1.8 specific gravity is reduced in strength until reactive acid liquor of specific gravity of not over 1.4 is obtained, and treating the residual gases with sulfuric acid of higher strength than that of aqueous sulfuric acid of 1.8 specific gravity, in the presence of a liquid absorbent for the gases immiscible with sulfuric acid, at a temperature above 60° C., continuing such reaction until ethyl sulfuric acid of specific gravity of not over 1.4 is obtained.

3. The process of utilizing hydrocarbon gases containing olefines for the preparation of useful products from substantially the entire olefine content thereof, in which such gases are treated, while cooling, with sulfuric acid, the effective strength of which is progressively reduced during such reaction to such extent that sulfuric acid having a strength equivalent to that of aqueous sulfuric acid of about 1.8 specific gravity is reduced in strength until reactive acid liquor of specific gravity of not over 1.4 is obtained, then treating the gases with sulfuric acid of a strength equivalent to that of aqueous sulfuric acid of about 1.8 specific gravity at a temperature of about 50° C., whereby any remaining olefines higher than ethylene are polymerized to waste sludge, and treating the residual gases with sulfuric acid of higher strength than that of aqueous sulfuric acid of 1.8 specific gravity, at a temperature above 60° C., continuing such reaction until ethyl sulfuric acid of specific gravity of not over 1.4 is obtained.

4. The process of utilizing hydrocarbon gases containing olefines to prepare acid liquors containing respectively sulfated derivatives of olefines of more than two carbon atoms and ethyl sulfate, in which the gases are first treated with a mixture of sulfuric acid and miscible diluent material, while cooling, whereby reactive acid liquor is produced containing sulfated derivatives of olefines of more than two carbon atoms, then treating the gases with like acid material at a temperature in the neighborhood of 50° C., whereby residual olefines of more than two carbon atoms are polymerized to waste sludge and then treating the gases with substantially undiluted sulfuric acid at a temperature above 60° C., whereby ethyl sulfate is produced substantially free from derivatives of olefines of more than two carbon atoms.

5. The process of utilizing still gases containing olefins for the preparation of useful products from substantially the entire olefine content thereof, which consists in contacting the gases with sulfuric acid of about 1.8 specific gravity, while cooling, whereby an acid extract containing sulphated derivatives of the olefins higher than ethylene is formed, then contacting the gases with sulfuric acid of like strength at a temperature above 50 degrees C. whereby residual olefins higher than ethylene are destroyed, and subsequently contacting the gases with sulfuric acid of at least 100% strength whereby an acid extract containing ethyl sulfuric acid is produced.

6. The process of utilizing still gases containing olefins for the preparation of useful products from substantially the entire olefine content thereof, which consists in contacting the gases with sulfuric acid of about 1.8 specific gravity, while cooling, whereby an acid extract containing sulphated derivatives of the olefine hydrocarbons higher than ethylene is formed, then contacting the gases with sulfuric acid of like strength at a temperature above 50 degrees C. whereby residual olefins higher than ethylene are destroyed, and subsequently contacting the gases with more highly concentrated sulfuric acid adapted to react with ethylene in the presence of a non-reactive liquid absorbent for the gases immiscible with sulfuric acid.

7. The process of utilizing still gases containing olefins for the preparation of useful products from substantially the entire olefine content thereof, which consists in contacting the gases with sulfuric acid of about 1.8 specific gravity, while cooling, whereby an acid extract containing sulphated derivatives of the olefine hydrocarbons higher than ethylene is formed, then contacting the gases with sulfuric acid of like strength at a temperature in the neighborhood of 50 degrees C. whereby residual olefins higher than ethylene are destroyed, and subsequently contacting the gases with more highly concentrated sulfuric acid adapted to react with ethylene in the presence of molten paraffin wax.

8. The process of utilizing still gases containing olefines for the preparation of useful products from substantially the entire olefine content thereof, which consists in contacting the gases with sulfuric acid reduced in strength to about the strength of aqueous sulfuric acid of 1.8 specific gravity in the presence of a non-reactive liquid absorbent for the gases immiscible with sulfuric acid, while cooling, whereby an acid extract containing sulfated derivatives of the olefine hydrocarbons higher than ethylene is formed, and subsequently contacting the residual gases with more highly concentrated sulfuric acid adapted to react with ethylene at a temperature above 60° C., whereby an acid extract containing ethyl sulfuric acid is produced.

9. The process of utilizing still gases containing olefines for the preparation of useful products from substantially the entire olefine content thereof, which consists in contacting the gases with aqueous sulfuric acid of about 1.8 specific gravity in the presence of a non-reactive liquid absorbent for the gases immiscible with sulfuric acid, while cooling; whereby an acid extract containing sulfated derivatives of the olefine hydrocarbons higher than ethylene is formed, and subsequently contacting the gases with more highly concentrated sulfuric acid adapted to react with ethylene in the presence of a non-reactive liquid absorbent for the gases immiscible with sulfuric acid at a temperature above 60° C., whereby an acid extract containing ethyl sulfuric acid is formed.

10. The process of forming an acid extract containing ethyl sulfuric acid from gases containing ethylene in the presence of saturated hydrocarbons, which consists in passing such gases through sulfuric acid sufficiently concentrated to react with ethylene in the presence of a non-reactive liquid absorbent for said gases immiscible with sulfuric acid and maintaining the temperature above 60° C.

11. The process of forming an acid extract containing ethyl sulfuric acid from gases containing ethylene in the presence of saturated hydrocarbons, which consists in passing said gases through sulfuric acid sufficiently concentrated to react with ethylene in the presence of a non-reactive hydrocarbon liquid and maintaining the temperature above 60° C.

12. The process of forming an acid extract containing ethyl sulfuric acid from gases containing ethylene in the presence of saturated hydrocarbons, which consists in passing said gases through sulfuric acid sufficiently concentrated to react with ethylene in the presence of molten wax.

CARLETON ELLIS.